United States Patent
Schaffler

(10) Patent No.: US 8,494,600 B2
(45) Date of Patent: Jul. 23, 2013

(54) MOBILE COMMUNICATION DEVICE

(75) Inventor: Gerald Schaffler, Graz (AT)

(73) Assignee: NXP B.V., Eindhoven (NL)

( * ) Notice: Subject to any disclaimer, the term of this patent is extended or adjusted under 35 U.S.C. 154(b) by 677 days.

(21) Appl. No.: 11/816,101

(22) PCT Filed: Feb. 10, 2006

(86) PCT No.: PCT/IB2006/050443
§ 371 (c)(1),
(2), (4) Date: Aug. 10, 2007

(87) PCT Pub. No.: WO2006/087662
PCT Pub. Date: Aug. 24, 2006

(65) Prior Publication Data
US 2008/0207282 A1    Aug. 28, 2008

(30) Foreign Application Priority Data
Feb. 17, 2005  (EP) ...................... 05101176

(51) Int. Cl.
*H04M 1/00* (2006.01)

(52) U.S. Cl.
USPC ............. 455/575.3; 455/575.1; 455/575.7

(58) Field of Classification Search
USPC ...................................... 455/575.3
See application file for complete search history.

(56) References Cited

U.S. PATENT DOCUMENTS

| | | | | |
|---|---|---|---|---|
| 5,539,148 A | * | 7/1996 | Konishi et al. | 174/391 |
| 5,548,161 A | * | 8/1996 | Hirano et al. | 257/722 |
| 6,342,859 B1 | | 1/2002 | Kurz et al. | |
| 6,348,895 B1 | * | 2/2002 | Tay et al. | 343/702 |
| 6,360,105 B2 | * | 3/2002 | Nakada et al. | 455/575.7 |
| 2002/0070040 A1 | * | 6/2002 | Oyang et al. | 174/35 R |
| 2002/0193946 A1 | * | 12/2002 | Turnbull | 701/219 |
| 2004/0183733 A1 | * | 9/2004 | Aoyama et al. | 343/702 |
| 2004/0189625 A1 | | 9/2004 | Sato | |
| 2004/0242211 A1 | * | 12/2004 | Akhteruzzaman et al. | 455/415 |
| 2009/0181732 A1 | * | 7/2009 | Isoda et al. | 455/575.3 |

FOREIGN PATENT DOCUMENTS

| | | |
|---|---|---|
| EP | 0783190 A1 | 7/1997 |
| EP | 0854535 A2 | 7/1998 |
| EP | 0854535 A3 | 7/1998 |
| JP | 58-139711 | 9/1983 |
| JP | 09009316 A | 1/1997 |
| JP | 2003-16409 A | 1/2003 |
| KR | 20020064454 A | 8/2002 |
| KR | 20040012401 A | 2/2004 |
| WO | 98/52295 A1 | 11/1998 |

\* cited by examiner

*Primary Examiner* — Lester Kincaid
*Assistant Examiner* — Andy Gu

(57) ABSTRACT

A mobile communication device (1, 10) comprises shielding components that provide electromagnetic shielding or attenuation between a first area (A) and a second area (B, B1, B2) within and/or external of the communication device (1, 10). In said first area (A) an antenna (4) and at least one ferrite (6) are arranged, which ferrite (6) is provided to interact with said antenna (4) and to guide a magnetic flux between said first area (A) and said second area (B, B1, B2).

20 Claims, 3 Drawing Sheets

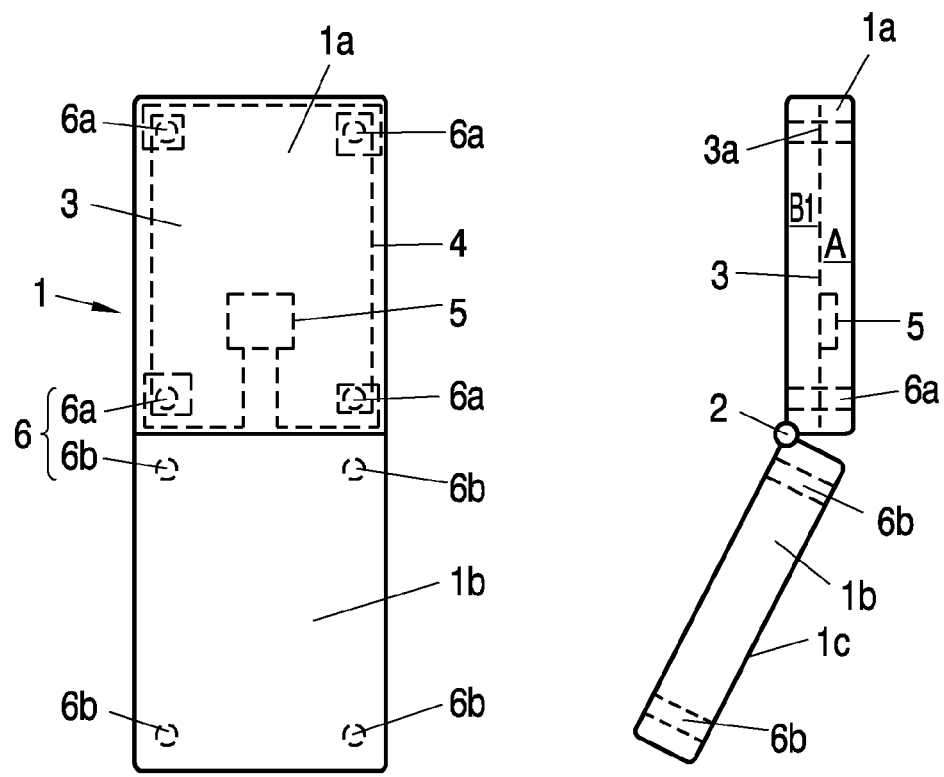
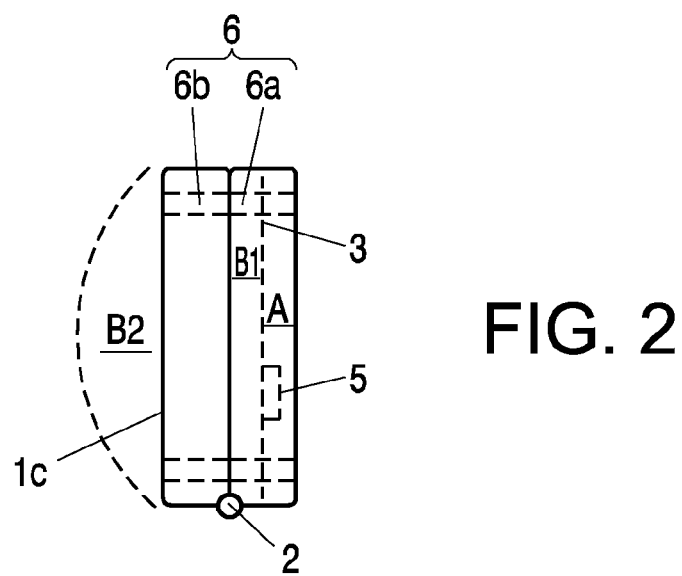
FIG. 1
FIG. 2

MOBILE COMMUNICATION DEVICE

FIELD OF THE INVENTION

The invention relates to a mobile communication device comprising shielding components, which cause electromagnetic shielding or attenuation between a first area and a second area within and/or external of the communication device.

BACKGROUND OF THE INVENTION

From document WO 98/52295 a short-range wireless audio communications system is known, including a miniaturized portable transceiver unit and a base unit transceiver. The miniaturized portable transceiver unit sends and receives information through magnetic induction to the base unit, which may also be portable. Similarly, the base unit sends and receives information through magnetic induction to the portable transceiver. The use of magnetic induction fields limits interference between a plurality of systems operating in close proximity to each other, and it reduces the power requirements. Each of the transducers preferably is a rod antenna such as a ferrite rod within a wire coil. In an embodiment of this known wireless audio communications system multiple transducers arranged in a variety of configurations are provided to generate multiple magnetic fields. In such multiple-transducer embodiments a diversity circuit is used to receive and/or transmit on at least one of the transducers. The generated multiple fields substantially eliminate mutual inductance nulls between the two units which typically occurs at certain positions in a generated magnetic field. The multiple transducers may be arranged in three directions orthogonal to each other. Such an arrangement can comprise ferrite rod transducers and/or loop coil transducers. The three orthogonal transducers can be placed in a corner along the sides of a portable telephone. Alternatively, a loop coil transducer could be placed along the back of the portable telephone, so that it could be made thinner.

EP 0 783 190 A1 relates to a similar RF communication system comprising a transponder unit adapted to communicate with an interrogation unit by transmitting RF signals to and receiving RF signals from the interrogation unit. The transponder unit should be able to effectively receive and transmit RF carrier signals when it is oriented in any of a variety of directions and distances relative to the interrogation unit. In order to achieve that goal the transponder unit is provided with a planar air coil antenna, and two elongated tubular ferrite antennas. The two elongated tubular ferrite antennas are arranged in the same plane as the planar air coil antenna and are perpendicular to each other, so that the maximum sensitivities of the three antennas are arranged in mutually orthogonal directions. Due to the use of three antenna coils the transponder unit can effectively receive RF signals irrespective of the orientation of the transponder unit with respect to the interrogation unit.

The known wireless audio communications system and the known RF communication system, however, have shown the disadvantage that they only consider external interference and nulls of the electromagnetic fields between a transceiver unit (transponder unit) and a base unit transceiver (interrogation unit), but disregard completely interference or nulls of the electromagnetic fields that are caused by the construction of one or both of the devices communicating with each other. However, the inventors have recognized that insufficient reception and transmission of electromagnetic signals is very often caused by unwanted shielding of electromagnetic signals within a communication device or between internal and external areas by components of this device. For instance, components of a communication device like printed circuit boards, displays, batteries shield or at least attenuate electromagnetic fields so that these communication devices show significant directional dependencies in respect of their receiving/transmission capability for electromagnetic signals. This problem increases when the mobile communication device, such as a mobile telephone, is equipped with additional RF communication means like RFID readers/writers, RFID tags or Near Field Communication (NFC) devices. These additional communication means are usually incorporated in packaged integrated circuits which are placed on one main surface of a printed circuit board (PCB). PCBs usually comprise multiple layers, wherein at least one of them is a grounding layer that shields electromagnetic fields. Hence, RF communication between these additional RF communication means and external communication devices is confined to that side of the communication device housing the RF communication means.

OBJECT AND SUMMARY OF THE INVENTION

It is an object of the invention to provide a mobile communication device of the type defined in the opening paragraph, in which the disadvantages defined above are avoided.

In order to achieve the object defined above with a mobile communication device according to the invention, characteristic features are provided so that a mobile communication device according to the invention can be characterized in the way defined below, that is:

A mobile communication device comprising shielding components, which cause electromagnetic shielding or attenuation between a first area and a second area within and/or external of the communication device, wherein in said first area an antenna and at least one ferrite are arranged, which ferrite is provided to interact with said antenna and to guide a magnetic flux between said first area and said second area.

The characteristic features according to the invention provide the advantage that the shielding or attenuating of electromagnetic fields between the first and the second area by electromagnetically shielding components is overcome, so that wireless communication is no longer restricted to the first area. Hence, RF communication means like NFC devices can be arranged in both the first and the second area. Further, electromagnetic signals arriving in the second area are received by an antenna in the first area. Even in the case where a PCB of the communication device causes electromagnetic shielding, it is still possible to position RF communication means on both sides of a PCB of the device, since the magnetic flux of electromagnetic signals is guided between the first and the second area. Compared with prior art devices RF communication capability of electronic circuits located in the second area is dramatically increased. It should be observed that the term "shielding component" as used throughout this text is to be understood in a sense that it does not necessarily cause complete shielding of electromagnetic fields, but attenuates a magnetic field to some extent. It should further be noted that the ferrite is not necessarily arranged in the first area as a whole. The ferrite may rather be part of the second area too.

It is advantageous when said ferrite is arranged to bridge the first area with the second area and/or when said ferrite penetrates said shielding components. These measures provide the advantage that the magnetic flux is guided with high coupling efficiency between the first and second areas. For instance, when the shielding component is a multi-layer PCB comprising at least one grounding layer, a through hole can be provided in the PCB through which the ferrite projects.

It is further advantageous, when said mobile communication device comprises a first device portion and a second device portion, which are displaceable in respect of each other between a first and a second operating position, wherein the ferrite is split into a first ferrite part being arranged in the first device portion and a second ferrite part being arranged in the second device portion, wherein in the first operating position said first and second ferrite parts are adjacent to each other and in the second operating position said first and second ferrite parts are interspaced. Hence reception and transmission of electromagnetic fields can be ensured in all areas of the mobile communication device even when the mobile communication device comprises two or more portions that are displaceable with respect to each other. Further, by splitting the ferrite into ferrite parts, a very compact but flexible structural shape of the communication device can be achieved.

It is further advantageous, when said first device portion and said second device portion are connected by means of a hinge, or by means of a slide. Thus a predefined first and second operating position is given, so that wireless communication works in both areas of the communication device irrespective of whether the device is opened or closed.

Yet another preferred embodiment of the invention is a mobile communication device, wherein the ferrite is a ferrite rod split into first and second ferrite parts transverse to its longitudinal axis, and the first and second ferrite parts are arranged in the first device portion and second device portion in such a manner that in the first operation position they are arranged coaxially. Therefore the advantage that the ferrite parts complement each other to a ferrite rod that guides a magnetic flux with high efficiency is provided, since the respective axes of the ferrite parts coincide and the adjacent faces of the ferrite parts are abutting so that magnetic losses are minimized.

Finally it is advantageous,
when the antenna of the mobile communication device comprises an electrical conductor, which electrical conductor at least partly encompasses the ferrite and/or
when the electrical conductor comprises multiple conductor sections, each of them partly encompassing the ferrite, and/or
when the conductor defines an inner area that comprises coupling zones and transition regions between the coupling zones, wherein a ferrite is arranged in each coupling zone, and wherein the width of the transition regions is reduced in respect of the width of the corresponding coupling zones.

These measures provide the advantage that the production process of such a device can be highly automated and is applicable to PCB mounting processes. Further, a single antenna can generate a magnetic flux in a plurality of ferrites. By directing the electrical conductor of the antenna as proposed in the aforesaid manner, losses of magnetic flux are kept very low and the electromagnetic field is concentrated in the regions where the ferrites are positioned.

The aspects defined above and further aspects of the invention are apparent from the example of embodiment to be described hereinafter and are explained with reference to this example of embodiment.

BRIEF DESCRIPTION OF THE DRAWINGS

The invention will be described in more detail hereinafter with reference to examples of embodiments. However, the invention is not limited to these examples of embodiments.

FIG. 1 shows a first embodiment of a mobile communication device according to the invention in top view and in side view in open state.

FIG. 2 shows the mobile communication device of FIG. 1 in side view in closed state.

DESCRIPTION OF EMBODIMENTS

Figure 3:
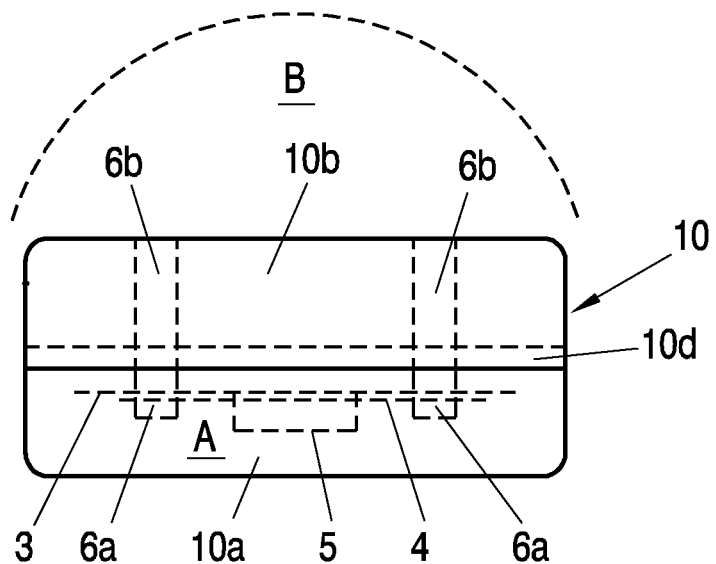
FIG. 3 shows a second embodiment of a mobile communication device according to the invention in side view in closed state.

FIG. 1 shows a first mobile communication device 1 according to the invention. This mobile communication device 1 is of the so-called clamshell device type having a first and a second device portion 1a, 1b, which are linked together by means of a hinge 2. It should be observed that clamshell devices are also known as flip cover devices, such as flip mobile phones. In the present embodiment first device portion 1a constitutes a body of the mobile communication device 1, and second device portion 1b constitutes a corresponding cover. The first and second device portion 1a and 1b are moveable relative to each other between a first and a second operating position depicted in FIG. 1. In the first operating position, which is a closed operating position, the two device portions 1a, 1b are positioned adjacent to each other in such a manner that second device portion 1b, i.e. the cover completely covers one side of the first device portion 1a, i.e. the body. In the second operating position, which is an open operating position, the two device portions 1a, 1b are positioned at an angle to each other, so that said second device portion 1b does not cover said side of said first device portion 1a, but the whole first device portion 1a is exposed to the environment.

The first device portion 1a contains a carrier 3, such as a printed circuit board. The FIGS. 1-2 also show a first area A and a second area, the latter consisting of an internal second area B1 and an external second area B2. The first area A and the internal second area B1 within first device portion 1a are separated from each other by the carrier 3. On the surface of this carrier 3, facing said first area A, an antenna 4 and a reader 5 are located. The antenna 4 is assumed to be a metallic layer on carrier 3 and is thus not visible in the side views of FIGS. 1 and 2. The reader 5 sends and receives electromagnetic signals via the antenna 4. For instance, the reader 5 may be configured as a near-field communication device or as an RFID device for communicating with wireless RF transponders. Second device portion 1b shields electromagnetic fields, either due to electromagnetically shielding materials used for structural elements of said second device portion 1b, or due to electromagnetically shielding means and elements incorporated in said second device portion 1b, such as a display with metallic layers, a PCB with grounding layers, batteries, electronic components or the like. When the mobile communication device 1 is in its first closed operating position, first area A and internal second area B1 are shielded off from said external second area B2, depicted in FIG. 2 by a dotted line, due to this shielding effect of second device portion 1b. Hence, in this first closed operating position antenna 4 can only receive electromagnetic signals via said first area A, but not via said external second area B2.

In order to remedy this drawback, the invention proposes to arrange at least one ferrite 6 so that it cooperates with the antenna 4 to guide a magnetic flux between the areas A, B1 and B2. In the present embodiment, four ferrites 6 are provided near the corners of the mobile communication device 1, wherein each of these ferrites 6 cooperates with the antenna 4 by having one winding of the antenna 4 wound around each ferrite 6. The ferrites 6 are configured as ferrite rods, wherein each ferrite 6 is composed of a first and a second ferrite part 6a and 6b. Said first ferrite parts 6a are arranged in the first device portion 1a in such a manner that they are fixed to the carrier 3 and project through holes 3a of the carrier 3, so that they extend through the whole first device portion 1a. The second ferrite parts 6b of each ferrite 6 are arranged in the second device portion 1b in such a position that in the first closed operating position the ferrite parts 6a, 6b are coaxially positioned adjacent to each other. Hence, in the first closed operating position the ferrites 6 extend transversely through the mobile communication device 1, thereby bridging the first and second area A, B1 and B2. Therefore, a magnetic flux induced into the second ferrite parts 6b by an electromagnetic field occurring at external second area B2 is guided through the second ferrite parts 6b and the corresponding first ferrite parts 6a to internal second area B1 and also to first area A where the magnetic flux induces an electromotive force in antenna 4. In a similar manner, RF electromagnetic signals generated by antenna 4 are radiated to both first area A and external second area B2 by means of the ferrites 6. When the mobile communication device 1 is in its second open operating position, second device portion 1b does not shield off first device portion 1a. Hence, electromagnetic fields being present in internal second area B1 are received by the first ferrite parts 6a, and the magnetic flux thus generated in the first ferrite parts 6a is guided to antenna 4 at first area A. Therefore the antenna 4 is effective on both sides of the mobile communication device 1, irrespective of whether the cover is open or not.

It should be observed that in the present embodiment of the invention not necessarily only second device portion 1b constitutes shielding means, but also the carrier 3 arranged in first device portion 1a constitutes electromagnetic shielding means, when configured as a multi-layer PCB with at least one grounding layer. In such a case the first ferrite parts 6a function to electromagnetically bridge first area A and internal second area B1 by penetrating carrier 3, so that the antenna 4 is effective on both sides of the first device portion 1a of the mobile communication device 1.

Figure 4:
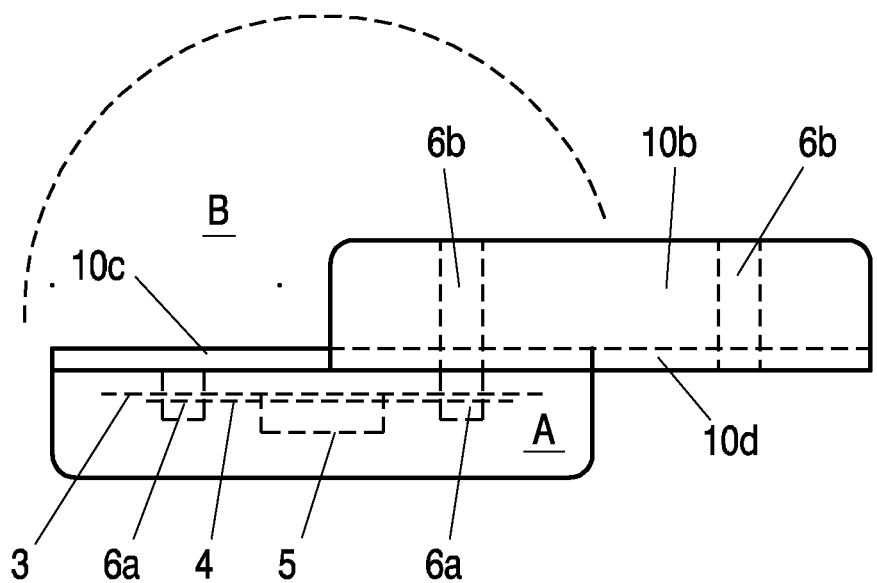
FIG. 4 shows the mobile communication device of FIG. 3 in side view in open state.

FIGS. 3 and 4 show an alternative mobile communication device 10 according to the invention. This mobile communication device 10 comprises a first and a second device portion 10a and 10b which are linked together by means of a slide 10c, 10d. For instance, mobile communication device 10 could be a mobile phone. The device portions 10a and 10b are moveable relative to each other between a first operating position depicted in FIG. 3, and a second operating position depicted in FIG. 4. In the first operating position, which is a closed operating position, the two device portions 10a, 10b are positioned on top of each other. In the second operating position, which is an open operating position, the two device portions 10a, 10b are offset relative to each other, so that a part of the upper side of the first device portion 10a and a part of the lower side of the second device portion 10b are exposed to the environment. The first device portion 10a contains a carrier 3 on which an antenna 4, made of a wire, and a reader 5 are located. The reader 5 sends and receives electromagnetic signals via the antenna 4. For instance, the reader 5 may be configured as a near-field communication device or as an RFID device for communication with wireless RF transponders. Second device portion 10b is made of materials that shield or attenuate electromagnetic fields. So, when the communication device 10 is in its closed operating position, second device portion 10b shields an first area A from an second area B, so that it is not possible for antenna 4 to directly send and receive electromagnetic signals to and from second area B. In order to enable wireless communication between antenna 4 and second area B ferrites 6 are provided to guide a magnetic flux between first and second area A and B. In the present embodiment first ferrite parts 6a are arranged in the first device portion 10a in such a manner that they are fixed to the carrier 3 and project through the whole first device portion 10a. Second ferrite parts 6b are arranged in the second device portion 10b in such a position that in the closed operating position the ferrite parts 6a, 6b are coaxially positioned adjacent to each other forming ferrite rods. Hence, in the closed operating position the ferrite rods extend transversely through the mobile communication device 10 thereby bridging the first and second area A and B. Therefore, a magnetic flux induced into the second ferrite parts 6b by an electromagnetic field occurring at second area B is guided through the second ferrite parts 6b and the corresponding first ferrite parts 6a to first area A where the magnetic flux induces an electromotive force in antenna 4.

When the mobile communication device 10 is in its second open operating position, second device portion 10b only partly shields off first device portion 10a. Hence, on the one hand electromagnetic fields present in second area B are directly received by the left-hand first ferrite part 6a, and the magnetic flux thus generated in the ferrite parts 6a is guided to antenna 4. On the other hand, the right-hand first ferrite part 6a of first device portion 10a coincides with the left second ferrite part 6b of second device portion 10b, forming together a ferrite rod that guides a magnetic flux transversely through second device portion 10b to antenna 4. Therefore, the antenna 4 is effective on both sides of the mobile communication device 10, independently of whether the two device portions 10a, 10b are in an open or closed position.

It should be noted, that the aforementioned coaction between the right-hand first ferrite part 6a of first device portion 10a and the left-hand second ferrite part 6b of second device portion 10b is of advantage but is not mandatory. It should further be noted that—although this is not shown in the FIGS. 3-4—the mobile communication device 10 may also comprise an internal second area B1 and an external second area B2 as shown in FIGS. 1-2 in the case where the first device portion 10a comprises shielding components (i.e. the carrier 3).

Figure 5:
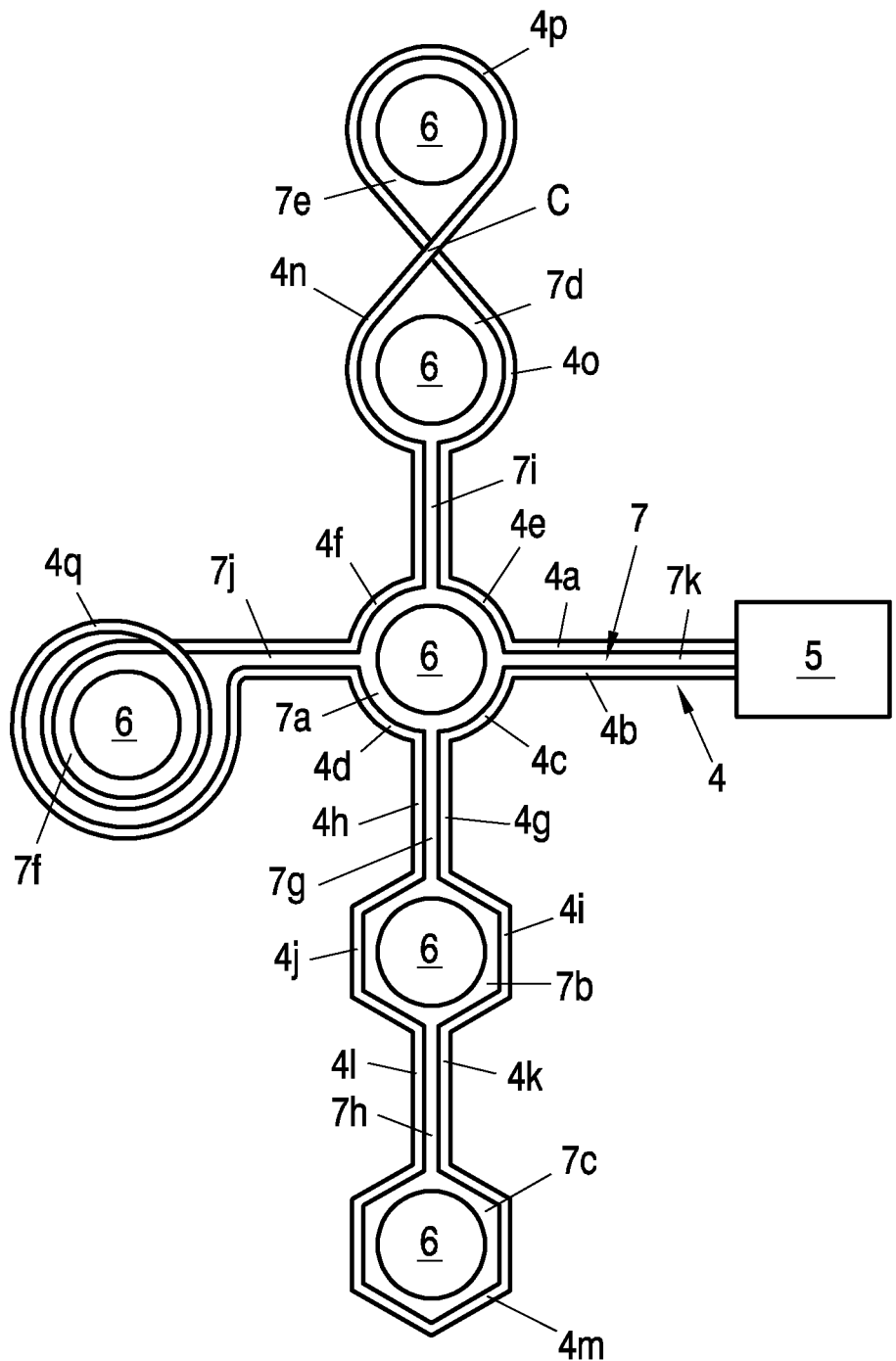
FIG. 5 shows examples of configurations of an antenna and multiple ferrites for incorporation in the mobile communication device according to the invention.

Preferably, the antenna 4 is configured as a planar antenna with an electrical conductor arranged on carrier 3, which conductor comprises conductor sections 4a-4q. At least some of said conductor sections 4a-4q can be shaped as conductor paths of a PCB, and some can be configured as wires. FIG. 5 shows some examples of how the antenna 4 and the ferrites 6 can be configured in order to maximize electromagnetic coupling and to provide simple production of the same. The antenna 4 depicted in FIG. 5 comprises an electrical conductor, both ends of which are connected with the reader 5, so that the conductor of antenna 4 defines a closed loop that circumscribes an inner area 7. The conductor sections 4a-4q of the antenna 4 are configured in such a manner that multiple coupling zones 7a-7f are defined in this inner area 7 by sections of the antenna's 4 conductor that at least partly encompass the coupling zones 7a-7f. In each of the coupling zones 7a-7f one ferrite 6 is positioned so that electric currents flowing in the conductor induce a magnetic flux in the ferrites 6. The coupling zones 7a-7f are interspaced by transition regions 7g-7j of the inner area 7, which transition regions 7g-7j are defined between parallel sections of the conductor of the antenna 4. Preferably, the transition regions 7g-7j are of reduced width compared to the width of the corresponding coupling zones 7a-7f, so that the respective sections of the conductor encircle the coupling zones in an encircling angle of almost 360°, as can be seen from FIG. 5 and will now be explained in detail.

Between the reader 5 and the coupling zone 7a two conductor sections 4a, 4b of the antenna 4 extend in parallel and define a transition region 7k between each other, which has a very small width and consequently a very small area. This transition region 7k leads into a coupling zone 7a, which has approximately a circular shape. The coupling zone 7a is defined by four conductor sections 4c, 4d, 4e, 4f, each of them partly encircling the coupling zone 7a. Coupling zone 7a has a diameter considerably larger than the width of the transition region 7k. From coupling zone 7a three further transition regions 7g, 7i, 7j branch off. Transition region 7g is defined by parallel conductor sections 4g, 4h and leads into coupling zone 7b, which has an approximately hexagonal shape. Coupling zone 7b is defined by conductor sections 4i, 4j. Another transition region 7h that leads into a coupling zone 7c of hexagonal shape extends from coupling zone 7b. Transition region 7h is defined by parallel conductor sections 4k, 4l that extend very close to each other. The coupling zone 7c is defined by conductor section 4m and has a diameter that is considerably larger than the width of transition region 7h. Since the conductor sections 4g, 4h; 4k, 4l forming the transition regions 7g and 7h between the coupling zones 7a, 7b and 7c, respectively, are very close to each other, the conductor sections 4i, 4j defining coupling zone 7b and the conductor section 4m forming coupling zone 7c flare to reach the increased diameter of said coupling zones 7b, 7c.

By said flaring and narrowing of conductor sections 4i, 4j, 4m coupling zones 7b, 7c are encircled by the conductor sections 4i, 4j; 4m by almost 360°. This is an important advantage compared with just placing the ferrites 6 between parallel sections of the conductor of an antenna, since the whole lengths of conductor sections 4i, 4j; 4m significantly contribute to electromagnetic coupling between the conductor of antenna 4 and the ferrites 6. The larger the encircling angle the better is the electromagnetic coupling between the conductor of the antenna 4 and the ferrites 6. In contrast to an antenna without small transition regions between the coupling zones, the electromagnetic field strength within the coupling zones 7a-7f of the present antenna 4 is increased, whereas the inductance of the antenna 4 is decreased.

The transition region 7i branching from coupling zone 7a leads into coupling zone 7d that is defined by two conductor sections 4n, 4o flaring and then narrowing until they cross each other at a crossing C. Therefore the encircling angle of coupling zone 7d by the conductor sections 4n, 4o is almost 360°. Starting from crossing C another conductor section 4p forms a loop that entirely encircles a coupling zone 7e. The electrical conductor may also be twisted by another half turn at crossing C, so that the magnetic flux in the coupling zones 7d and 7e is directed in the same direction.

Another coupling zone 7f is encircled one and a half times by a conductor section 4q. It should be noted that more windings of the conductor around the ferrite 6 may be useful to further increase the coupling between the conductor of antenna 4 and the ferrite 6. Between coupling zone 7f and coupling zone 7a transition region 7j is arranged.

It should be observed that the described arrangement of the planar antenna 4 and the ferrites 6 is only an example to highlight the various possibilities offered by the invention. In practice, in a combination of planar antenna 4 and ferrites 6 the number of ferrites 6 will usually be lower than shown in FIG. 5 and the number and extension of the conductor sections 4a-4q will be selected in order to achieve a construction that is easy and cheap to produce and takes into account the position of other electronic components. The configuration shown in FIG. 5 is to be understood as a design proposal for various arrangements. This proposal is directed at those skilled in the art to enable them to choose parts of these design proposals for a specific layout of an antenna-ferrite combination.

It should be noted, that one skilled in the art can easily imagine that the invention refers to all kinds of mobile communication devices, such as mobile phones, PDAs, cordless phones, CD- and MP3-players as well as to digital cameras only to mention some of them.

Finally it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The mere fact that certain measures are recited in mutually different dependent claims does not indicate that a combination of these measures cannot be used to advantage.

The invention claimed is:

1. A mobile communication device comprising:
an antenna in a first area;
a ferrite comprising a first ferrite part in the first area and a second ferrite part in a second area; and
shielding components configured to, cause electromagnetic shielding or attenuation between the first area and the second area, wherein the ferrite is configured to interact with the antenna and guide a magnetic flux between the first area and the second area.

2. The mobile communication device as claimed in claim 1, wherein the ferrite is configured to electromagnetically couple the first area with the second area.

3. The mobile communication device as claimed in claim 2, wherein the ferrite penetrates said shielding components.

4. The mobile communication device as claimed in claim 1, wherein the antenna comprises an electrical conductor that at least partly encompasses the ferrite.

5. The mobile communication device as claimed in claim 4, wherein the electrical conductor comprises multiple conductor sections, each section partly encompassing the ferrite.

6. The mobile communication device as claimed in claim 4, wherein the electrical conductor defines an inner area that comprises coupling zones and transition regions between the coupling zones, wherein a ferrite is arranged in each coupling zone, and wherein a width of the transition regions is reduced relative to a width of the corresponding coupling zones.

7. The mobile communication device of claim 1, wherein four ferrites are provided near corners of the mobile communication device.

8. The mobile communication device of claim 7, wherein one winding of the antenna is wound around each of the four ferrites.

9. The mobile communication device of claim 3, wherein the ferrite is a ferrite rod that projects through at least one hole in the shielding components.

10. The mobile communication device of claim 6, wherein at least one coupling zone has an approximately circular shape.

11. The mobile communication device of claim 6, wherein at least one coupling zone has an approximately hexagonal shape.

12. The mobile communication device of claim 6, wherein two coupling zones have approximately hexagonal shapes.

13. The mobile communication device of claim 6, wherein conductor sections substantially encircle the coupling zones.

14. A mobile communication device comprising:
an antenna in a first area;
a ferrite comprising a first ferrite part in the first area and a second ferrite part in a second area;
shielding components configured to cause electromagnetic shielding or attenuation between the first area and the second area, wherein the ferrite is configured to interact with the antenna and guide a magnetic flux between the first area and the second area;
a first device portion; and
a second device portion, which are displaceable relative to each other between a first operating position and a second operating position, wherein the first ferrite part is arranged in the first device portion and the second ferrite part is arranged in the second device portion, and wherein, in the first operating position, said first and second ferrite parts are adjacent to each other and, in the second operating position, said first and second ferrite parts are interspaced.

15. The mobile communication device as claimed in claim 14, wherein said first device portion and said second device portion are connected by means of a hinge.

16. The mobile communication device as claimed in claim 14, wherein the first and second ferrite parts are arranged in the first device portion and the second device portion in such a manner that, in the first operating position, they are arranged coaxially.

17. The mobile communication device of claim 14, wherein the ferrite is a ferrite rod that extends through the first device portion.

18. The mobile communication device of claim 14, wherein the first device portion is offset relative to the second device portion in the second operating position.

19. The mobile communication device of claim 18, wherein, in the second operating position, a portion of an upper side of the first device portion is exposed.

20. The mobile communication device of claim 18, wherein, in the second operating position, a portion of a lower side of the second device portion is exposed.

* * * * *